United States Patent [19]
Saiki

[11] Patent Number: 6,094,019
[45] Date of Patent: Jul. 25, 2000

[54] MOTOR DRIVE CIRCUIT

[75] Inventor: Shinichi Saiki, Niwa-gun, Japan

[73] Assignee: Kabushiki Kaisha Tokai Rika Denki Seisakusho, Aichi, Japan

[21] Appl. No.: 09/313,199

[22] Filed: May 18, 1999

[30] Foreign Application Priority Data

May 19, 1998 [JP] Japan ................................. 10-136676

[51] Int. Cl.$^7$ ..................................................... H02P 1/58
[52] U.S. Cl. ......................... 318/102; 318/103; 318/139; 318/54
[58] Field of Search .................. 318/38, 41, 49, 318/58, 65, 66, 67, 101, 102, 103, 139, 543

[56] References Cited

U.S. PATENT DOCUMENTS

| | | | |
|---|---|---|---|
| 3,147,423 | 9/1964 | Rocher | 318/280 |
| 3,573,576 | 4/1971 | Nakabo | 318/102 |
| 3,575,648 | 4/1971 | Ridding | 318/106 |
| 3,576,482 | 4/1971 | Rhee | 318/16 |
| 4,143,813 | 3/1979 | Bryans | 236/51 |
| 4,264,849 | 4/1981 | Fleischer et al. | 318/568 |
| 4,288,726 | 9/1981 | Vazquez-Cuervo et al. | 318/54 |
| 4,887,941 | 12/1989 | Crinquette et al. | 417/205 |
| 5,517,091 | 5/1996 | Becher et al. | 318/49 |

FOREIGN PATENT DOCUMENTS 1-6791  1/1989  Japan .

*Primary Examiner*—Stanley J. Witkowski
*Assistant Examiner*—Rita Leykin
*Attorney, Agent, or Firm*—Morgan, Lewis & Bockius LLP

[57] ABSTRACT

The common contact 5a of a power source circuit side relay 2a is connected to the common contact 15a of a motor circuit side relay 12a. The common contact 5b of a power source circuit side relay 2b is connected to the common contact 15b of a motor circuit side relay 12b. And, the switching contacts 6a and 6b, and 16a and 16b of the power source circuit sides relays 2a and 2b and the motor circuit side relays 12a and 12b are tripped in response to relay switching signals provided by an ECU. The power source circuit side relays 2a and 2b are selectively switched, so that the directions of flow of currents in the motor circuits 21 through 24 are changed.

1 Claim, 2 Drawing Sheets

FIG. 2

ECU OUTPUT SIGNAL

| MOTOR | ROTATION DIRECTION | POWER SOURCE CIRCUIT SIDE RELAY | | MOTOR CIRCUIT SIDE RELAY | |
|---|---|---|---|---|---|
| | | 2a | 2b | 12a | 12b |
| M1 | FORWARD | 1 | 0 | 0 | 0 |
| | REVERSE | 0 | 1 | 0 | 0 |
| M2 | FORWARD | 1 | 0 | 0 | 1 |
| | REVERSE | 0 | 1 | 0 | 1 |
| M3 | FORWARD | 1 | 0 | 1 | 0 |
| | REVERSE | 0 | 1 | 1 | 0 |
| M4 | FORWARD | 1 | 0 | 1 | 1 |
| | REVERSE | 0 | 1 | 1 | 1 |

MOTOR DRIVE CIRCUIT

BACKGROUND OF INVENTION

1. Field of invention

This invention relates to a motor drive circuit.

2. Related art

Heretofore, in a power sheet system which is controlled by an electronic control unit, a relay circuit is used to switch a motor drive circuit thereby to control the forward and reverse rotations thereof. In this case, it is necessary to provide two (2) relays per motor. Hence, an eight-way power sheet in which four motors are used to control the slide movement, forward and backward vertical movement, and reclining movement of a sheet, needs eight (8) relays. And there has been a demand for reduction of the manufacturing cost with the electronic control unit built in the power sheet controlling switch device.

However, if the electronic control unit and the eight (8) relays are built in the power sheet controlling switch device, then the latter is unavoidably bulky, which lowers its commodity value.

SUMMARY OF INVENTION

An object of the invention is to solve the above-described difficulty. More specifically, an object of the invention is to provide a motor drive circuit in which the number of necessary relays is reduced, thereby to decrease not only the weight but also the manufacturing cost.

The foregoing object has been achieved by the provision of a motor drive circuit, in which, according to the invention, two sets of relay circuits are employed which connect the common contacts of power source circuit side relays and motor circuit side relays, the positive side of a DC power source is connected to the normally open contacts of two power source circuit side relays, while the negative side of the DC power source is connected to the normally closed contact to the two power source circuit side relays;

a first motor is connected between the normally closed contacts of two motor circuit side relays;

a second motor is connected between the normally closed contact of one relay and the normally open contact of the other relay;

a third motor is connected between the normally open contact of the one relay and the normally closed contact of the other relay; and a fourth motor is connected between the normally open contacts of the two motor circuit side relays, and the relays being individually switched.

The above-described motor drive circuit functions as follows: When the switching contact (armature) of any one of the two power source circuit side relays is tripped over to the normally open contact, a power source circuit is completed. And, the power source circuit side relays are selectively switched to change the direction of flow of current. If, in this case, none of the motor circuit side relays are switched, the first motor is driven. When the switching contact of any one of the two motor circuit side relays is tripped over to the normally open contact, the second or third motor is driven. When the switching contacts of the two motor circuit side relays are both tripped over to the normal open contacts, the fourth motor is driven. The direction of rotation of each motor is changed as follows; that is, the power source circuit side relays are selectively switched to change the direction of low of current thereby to change the direction of rotation of each motor. With the motor drive circuit of the invention, the four motors are individually driven, and are changed in the direction of rotation. Hence, although heretofore eight relays are employed, according to the invention the number of relays is reduced from eight to four. Furthermore, this feature makes it possible to reduce the size, the weight, and the manufacturing cost of the motor drive circuit.

BRIEF DESCRIPTION OF THE DRAWINGS

FIG. 2 is an explanatory diagram for a description of output states of relay switching signals.

DETAILED DESCRIPTION OF PREFERRED EMBODIMENTS

Figure 1:
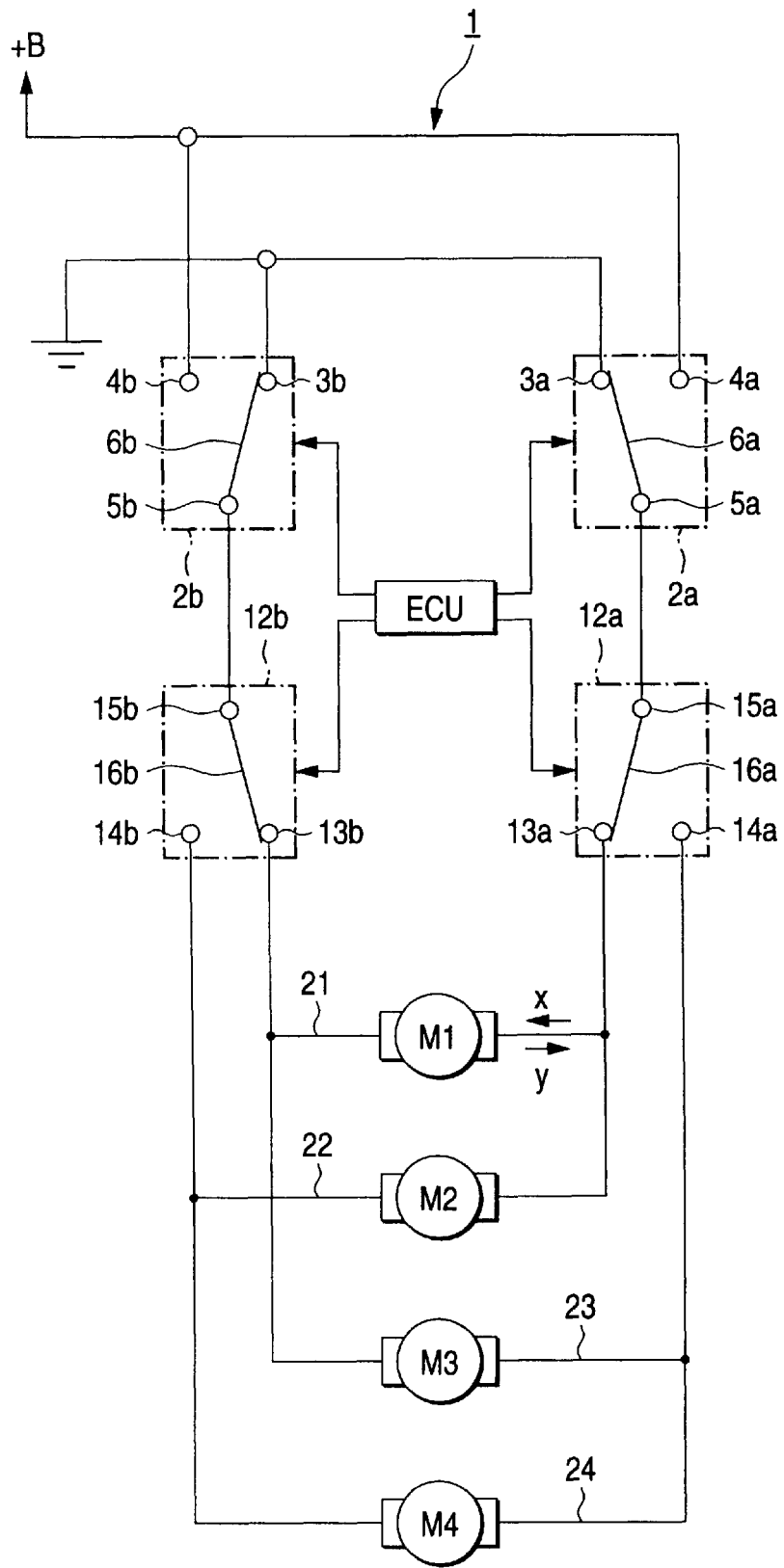
FIG. 1 is a circuit diagram of a motor drive circuit according to the invention.

One embodiment of the invention will be described with reference to the accompanying drawings. FIG. 1 is a circuit diagram showing the arrangement of a motor drive circuit according to the invention. The ground (earth) terminal of a DC power source circuit 1 is connected to the normally closed contacts 3a and 3b of two power source circuit side relays 2a and 2b. And a (+B) terminal is connected to normally open contacts 4a and 4b.

The normally closed contacts 13a and 13b of two motor side relays 12a and 12b are connected to a first motor circuit 21 which includes a first motor M1. The normally closed contact 13a of the motor side relay 12a, and the normally open contact 14b of the motor side relay 12b are connected to a second motor circuit 22 which includes a second motor M2. And the normally open contact 14a of the motor side relay 12a, and the normally closed contact 13b of the motor side relay 12b are connected to a third motor circuit 23 which includes a third motor M3. Furthermore, the normally open contact 14a of the motor side relay 12a, and the normally open contact 14b of the motor side relay 12b are connected to a fourth motor circuit 24 which includes a fourth motor M4.

The common contact 5a of the power source circuit side relay 2a is connected to the common contact 15a of the motor side relay 12a. The common contact 5b of the power source circuit side relay 2b is connected to the common contact 15b of the motor circuit side relay 12b. The switching contacts (armatures) 6a and 6b, and 16a and 16b of the power source circuit side relays 2a and 2b, and the motor circuit side relays 12a and 12b are individually switched by relay switching signals of an electronic control unit (hereinafter referred to as "an ECU", when applicable). The relay switching signals are outputted according to a predetermined control program (provided in the ECU) in response to switching signals from a switch (not shown). When the power source circuit side relays 2a and 2b are selectively operated, the directions of flow of currents in the motor circuits 21 through 24 are changed.

When the relay switching signal of the ECU is applied to the power source circuit side relay 2a to drive the first motor M1, the switching contact 6a is tripped over to the normally open contact 4a. As a result, a current flows in the first motor circuit 21 in the direction of the arrow x, so that the first motor M1 is rotated in the forward direction. When, under this condition, the relay switching signal is applied to the power source circuit side relays 2a and 2b, so that the switching contact 6a is tripped over to the normally closed contact 3a while the switching contact 6b is tripped over to the normally open contact 4b, then a current flows in the first motor circuit 21 in the direction of the arrow y and the first motor M1 is rotated in the reverse direction.

Similarly, as shown in FIG. 2, when the relay switching signals of the ECU are applied to-the power source circuit side relays 2a and 2b and the motor circuit side relays 12a and 12b, the motor circuits 21 through 24 are completed, respectively. At the same time, the power source circuit side relays 2a and 2b are selectively switched, so the direction of flow of current is changed, whereby the motors M1 through M4 are rotated in the forward or reverse direction. In FIG. 2, numeral "1" indicates the fact that the switching contact of each relay is tripped from the normally closed contact to the normally open contact.

The above-described motor drive circuit employs four motors. Therefore, in the case where it is applied to the eight-way power sheet controlling switch device, which controls the slide movement, the forward and backward vertical movement and the reclining movement of the sheet, the number of relays is reduced. This feature makes it possible to reduce the size, the weight, and the manufacturing cost of the motor drive circuit; that is, the latter is high in utility as a vehicle power sheet control.

What is claimed is:

1. A motor drive circuit comprising:

two sets of relay circuits including power source circuit side relays and motor circuit side relays, the common contacts of said power source circuit side relays and side motor circuit side relays being connected, the positive side of a DC power source being connected to the normally open contacts of two power source circuit side relays, while the negative side of the DC power source being connected to the normally closed contact to said two power source circuit side relays;

a first motor connected between the normally closed contacts of two motor circuit side relays;

a second motor connected between the normally closed contact of one relay and the normally open contact of the other relay;

a third motor connected between the normally open contact of said one relay and the normally closed contact of said other relay; and a fourth motor connected between the normally open contacts of said two motor circuit side relays.

* * * * *